United States Patent [19]
Pineau

[11] 3,897,856
[45] Aug. 5, 1975

[54] VIBRATION DAMPER

[76] Inventor: Andre Lucien Pineau, 12, Rue de Bearn, 92 Saint-Cloud, France

[22] Filed: Feb. 15, 1974

[21] Appl. No.: 442,826

[30] Foreign Application Priority Data
Feb. 19, 1973   France............................. 73.05729

[52] U.S. Cl.................... 188/1 B; 248/358; 267/35
[51] Int. Cl..................................................... F16f 9/08
[58] Field of Search......... 188/1 B, 266; 248/21, 22, 248/358 R; 267/35

[56] References Cited
UNITED STATES PATENTS

| 179,240 | 6/1876 | Wells | 267/35 |
|---|---|---|---|
| 2,507,227 | 5/1950 | Skinner | 248/358 R |
| 2,614,896 | 10/1952 | Pierce | 188/1 B X |
| 2,664,257 | 12/1953 | McNally | 248/358 R X |
| 3,154,273 | 10/1964 | Paulsen | 248/22 |
| 3,658,314 | 4/1972 | Luzsicza | 267/35 X |

Primary Examiner—Duane A. Reger

[57] ABSTRACT

Damper having a cylindrical body defining an upper aperture for the passage of a coaxial load-supporting rod and having an open lower end closed by a plate. A viscous liquid fills the space defined by the body and the plate. The inner surface of the body is lined with a layer of an elastomeric material which is integral with the rod in its upper part and has a portion of reduced thickness which defines with the body a chamber for compensating for variations in volume of said space produced by displacements of the rod under the effect of the load and by resulting deformations of the upper part of the layer.

22 Claims, 6 Drawing Figures

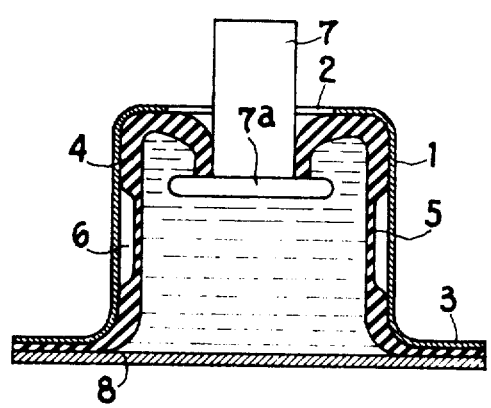
FIG._1
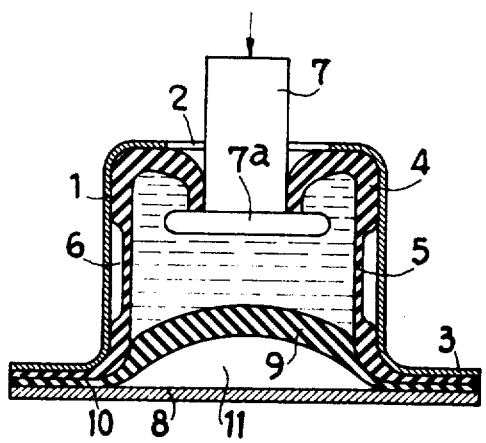
FIG._2
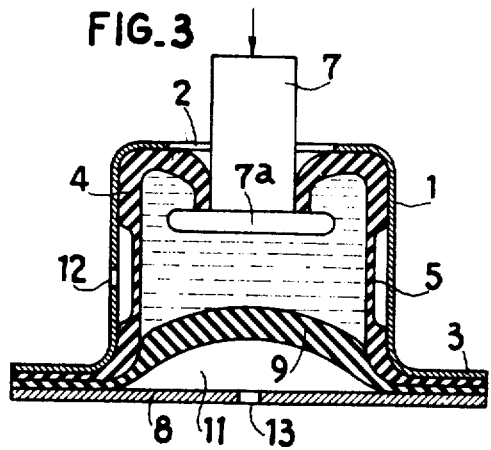
FIG._3
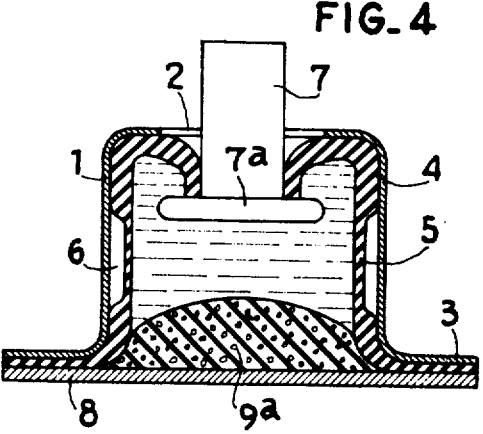
FIG._4
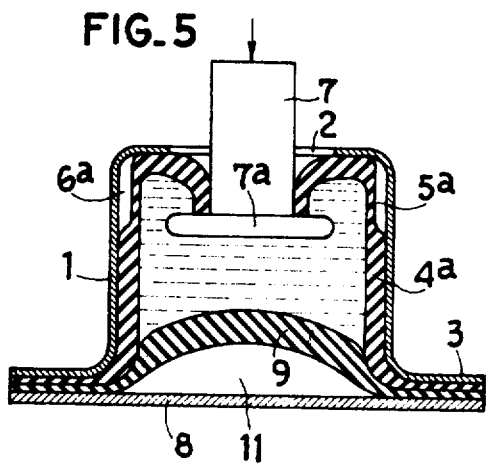
FIG._5
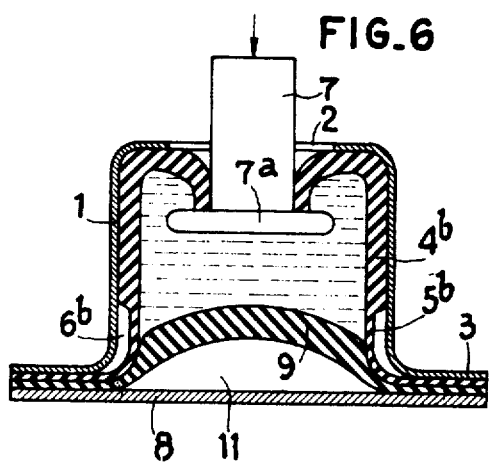
FIG._6

VIBRATION DAMPER

The present invention relates to vibration dampers and more particularly to visco-dynamic dampers.

Visco-dynamic dampers are known which comprise a cylindrical body in which a piston connected to the load to be supported by the damper is movable.

This cylindrical body, filled with a viscous fluid, is closed in an upper part by a deformable diaphragm which connects the cylindrical body to a centre piston in a fluidtight manner. Such a damper is described, for example, in French Pat. No. 1,280,076.

The desired is afforded by the throttling of the viscous fluid through orifices formed in the piston jointly with the internal hysteresis of this fluid.

Such a damper gives good results but has limitations as to its use which are due to its very principle.

If the deformable diaphragm is flexible, the natural frequency of the damper is low and the low-frequency vibrations are correctly absorbed. On the other hand, the weakness of the flexible diaphragm cannot allow high internal pressures resulting from a large shock, whence the risk of premature wear or bursting.

If the diaphragm is stiffer, shocks are better supported thereby but the higher frequency which results limits in the same proportion the absorption of low-frequency vibrations which are undesirable for many structures.

Further, owing to the general arrangement of the damper, the deformable diaphragm is very vulnerable to any agent of destruction so that special precautions have to be taken as concerns the position or the mounting of the damper.

An object of the invention is to overcome these various drawbacks of known dampers and in particular to provide a damper which can have a low frequency while it conserves a very high shock-absorbing capacity with no risk of deterioration or rupture.

The invention provides a vibration damper comprising an outer cylindrical body which has in its upper face an axial aperture for the passage of a rod for supporting a load to be suspended and which is closed in its lower part by a plate, said body and the plate defining a space containing a viscous liquid, wherein the walls of the body of the damper are provided with a layer of elastomeric material which is rendered integral in its upper centre part with the load-supporting rod and has a portion of reduced thickness which defines with the inner wall of the body a chamber for compensating for variations in volume of the inner space of the damper produced by the displacements of the rod under the effect of the load and by the resulting deformations of the upper part of the layer of elastomeric material.

Further features and advantages of the invention will be apparent from the ensuing description with reference to the accompanying drawing.

IN THE DRAWING

FIG. 1 is a diagrammatic sectional view of a first embodiment of a damper according to the invention;

FIG. 2 is a diagrammatic sectional view of a modification of the damper shown in FIG. 1, and FIGS. 3–6 are sectional views of other embodiments of a damper according to the invention.

The damper shown in FIG. 1 comprises an outer cylindrical body 1 of metal or other but little deformable material having in its upper face a circular aperture 2 and in its lower face a flange 3 perpendicular to the axis of the body.

The interior of the body 1 is lined with a layer of a deformable elastomeric material 4 having a low modulus of elasticity and bearing against the inner wall except for a thinner portion 5 thereof which defines with the inner wall of the body an annular chamber 6 for compensating for variations in volume of the inner space of the damper.

The layer 4 extends along the lower face of the flange 3 and moreover beyond the centre aperture 2 of the upper face of the body so as to be rendered integral by bonding with a centre rod 7 which is adapted to receive the mass to be suspended and is provided with a plate or flange 7a. The assembly is closed by a metal plate 8 connected to the extension of the elastomeric layer 4 and to the flange 3 of the body 1 by riveting, adhesion or any other method of assembly. The body 1 lined with the elastomeric layer 4 and the bottom plate 8 thus define a closed and sealed space. This space is filled with a viscous fluid, such as a silicone oil, having a viscosity adapted to the application of the damper.

The damper shown in FIG. 2 comprises, in addition to the elements included in the construction of the damper shown in FIG. 1, a deformable diaphragm 9 of an elastomeric material and having a much greater stiffness than the layer 4 lining the cylindrical body, the diaphragm 9 being secured to the lower part of the body 1.

The outer marginal portion 10 of the diaphragm 9 is applied against the corresponding wall of the lining 4 of the cylindrical body.

As in the embodiment shown in FIG. 1, the assembly is closed by a metal plate 8 which is connected to the two elastomeric layers and to the flange 3.

The damper therefore defines an inner space all of the walls of which are constituted by elastomeric layers and is therefore fully closed and sealed as in the case of the embodiment shown in FIG. 1.

Further, the diaphragm 9 and the plate 8 define a second sealed chamber 11 which may be filled with air or an inert gas.

As in the preceding embodiment, the inner space thus defined is filled with a viscous fluid such as silicone oil.

The damper shown in FIG. 1 constitutes an elastically yieldable support which has a viscous hydraulic type damping action and operates in the following manner :

Under the effect of the mass to be suspended which bears on the rod 7, the internal fluid is compressed and the resulting pressure is transmitted by this fluid in an isobar manner to all the walls of the inner space of the damper. This pressure maintains the inner layer 4 applied against the body 1 and considerably deforms the portion 5, bearing in mind the low modulus of elasticity of the elastomeric material employed and the thinness of the elastomeric layer of the portion 5.

The natural frequency of the damper, resulting from the closed spaced defined by the body 1 lined with the layer 4 and the plate 8, is therefore substantially a function of the flexibility of the portion 5 of the inner layer 4. It is thus possible to obtain low frequencies even with high amplitudes (reaching for example ± 2.5 mm).

The suspension problem at low-frequency is therefore perfectly resolved. However, the suspended structures are liable to receive high shock accelerations from either normal operation or the hazards of transport. The damper shown in FIG. 2 is particularly well adapted to operate under such conditions.

In the course of normal operation, the pressure applied against the diaphragm 9 imparts to the latter only a very slight deformation owing to the modulus of the elastomeric material employed and the great thickness of this diaphragm, so that the damper operates under the same conditions as the damper shown in FIG. 1.

However, when the internal pressure increases more and more owing to a shock acceleration, the portion 5 of the layer 4 undergoes considerable deformation which applies it against the inner face of the body 1. At this moment, the layer 4 is therefore applied against the body 1 in a substantially continuous manner, the metal body 1 constituting in fact a binding or support which limits the deformation of the portion 5 and thus precludes its deterioration. If the pressure transmitted by the fluid continues to increase, the diaphragm 9, having a high modulus of elasticity, in turn deforms until it reaches a postion of equilibrium. At this moment, the cycle reverses until the full damping of the shock.

The damping proper is ensured by the lamination which the viscous fluid undergoes during its movement and in particular by its passage through orifices or baffles (not shown) of the plate or flange 7a which is integral with the rod 7 and by the internal hysteresis of the fluid.

Thus it can be seen that the damper shown in FIG. 2 constitutes in fact two dampers in series which come into action in succession : a low-frequency damper which is operative above all for the filtering of vibrations and a damper having a high shock-absorbing capacity.

After the shock accelerations have disappeared, the assembly resumes its initial position with no alteration. The deformable elastomeric layer 4 is indeed fully supported on the outside by the metal body 1 except vertically below the aperture 2, the great thickness of the layer 4 in this region ensuring that it does not undergo excessive fatigue.

The damper shown in FIG. 3 is in every way similar to that shown in FIG. 2. However, the chamber 6 defined by the portion 5 of the elastomer layer 4 lining the body 1 of the damper and the inner wall of the body 1, on one hand, and the chamber 11 defined by the diaphragm 9 and the plate 8, on the other, are respectively put in communication with the atmosphere by way of orifices 12 and 13 of suitable diameters formed in the body 1 and in the plate 8. The chambers thus arranged act in the manner of pneumatic retarding means under the effect of the shocks undergone by the suspended load and transmitted to the damper.

In the damper shown in FIG. 4, the deformable diaphragm 9, employed in the dampers shown in FIGS. 2 and 3, is replaced by a cushion 9a of cellular material having closed cells.

The dampers shown in FIGS. 5 and 6 differ from the damper shown in FIG. 2 only in respect of the chosen position of the chamber provided between the elastomeric layer lining the body of the damper and the inner wall of this body.

In FIG. 5, the thin portion 5a of the layer 4a of elastomeric material is provided in the upper part of the body 1 so that the chamber 6a is also located in the upper part of the body.

In all the embodiments of the damper according to the invention, the layer of elastomeric material which lines the body 1 of the damper may be either simply applied against the inner wall of the body 1 or partially or totally bonded thereto.

Only the damper shown in FIG. 3 has orifices 12 and 13 putting the chambers 6 and 11 respectively in communication with the atmosphere to obtain a pneumatic retarding effect, but it will be understood that such an arrangement may be applied to all the types of dampers described and illustrated, a single chamber or both chambers being put in communication with the atmosphere.

In the case where the aforementioned chambers are maintained fluidtight, they may be filled with air or an inert gas.

Further, the cushion 9a of cellular material of the damper shown in FIG. 4 may also contain an inert gas, it being possible to adapt the compactness and the static deformation curve of this cushion to the intensity and the frequency of the shocks to be supported by the damper.

All the dampers which have been described contain spaces defined by the body and either the closing plate or the diaphragm 9 or the cushion 9a completely filled with viscous liquid.

However, it will be understood that this filling may be partial and adapted to the conditions of operation of the damper.

Having now described my invention what I claim as new and desire to secure by Letters Patent is:

1. A vibration damper comprising a rod for supporting a load to be suspended, and outer cylindrical body which is coaxial with the rod and has a lower open portion and an upper portion which defines an aperture for the passage of an end portion of the rod which extends into the body, a plate closing the lower portion of the body, the body and the plate defining a space containing a viscous liquid, a layer of an elastomeric material lining an inner surface of the body and having an upper portion coaxial with and integral with the rod, the layer defining a portion of reduced thickness which portion defines with the inner surface of the body a chamber for compensating for variations in volume of the inner space of the damper resulting from displacements of the rod under the effect of the load and deformations of the upper portion of the layer of elastomeric material which result therefrom.

2. A damper as claimed in claim 1, wherein the body has a flange and the layer of elastomeric material includes a portion which is opposed to the rod and maintained between the plate and the flange.

3. A damper as claimed in claim 1, wherein the layer of elastomeric material, apart from the portion thereof of reduced thickness, is partially secured to the inner surfaces of the body by bonding.

4. A damper as claimed in claim 1, wherein the layer of elastomeric material, apart from the portion thereof of reduced thickness, is wholly secured to the inner surface of the body by bonding.

5. A damper as claimed in claim 1, wherein the body has a cylindrical lateral wall and the portion of reduced thickness of the layer is located in confronting relation to a lower part of the lateral wall of the body.

6. A damper as claimed in claim 1, wherein the body has a cylindrical lateral wall and the portion of reduced thickness of the layer is located in confronting relation to a middle part of the lateral wall of the body.

7. A damper as claimed in claim 1, wherein the body has a cylindrical lateral wall and the portion of reduced thickness of the layer is located in confronting relation to an upper part of the lateral wall of the body.

8. A damper as claimed in claim 2, further comprising an elastically yieldable element disposed in a lower part of the body and having a peripheral portion which is maintained together with the portion of the layer opposed to the rod between the flange of the body and the plate, the fluidtight space containing said viscous liquid being defined by the body lined with the layer of elastomeric material and by the elastically yieldable element.

9. A damper as claimed in claim 8, wherein the elastically yieldable element has a modulus of elasticity higher than that of the layer.

10. A damper as claimed in claim 8, wherein said elastically yieldable element is constituted by a deformable diaphragm which defines with the plate a second chamber for absorbing variations in volume of the space containing the viscous liquid under the effect of large forces of the load.

11. A damper as claimed in claim 8, wherein the elastically yieldable element is constituted by a cushion of cellular material having closed cells which bears on the plate, said cushion being filled with air.

12. A damper as claimed in claim 8, wherein the elastically yieldable element is constituted by a cushion of cellular material having closed cells which bears on the plate, said cushion being filled with an inert gas.

13. A damper as claimed in claim 1, wherein said chamber defined by the portion of reduced thickness of the layer and the inner surface of the body is filled with air.

14. A damper as claimed in claim 1, wherein said chamber defined by the portion of reduced thickness of the layer and the inner surface of the body is filled with an inert gas.

15. A damper as claimed in claim 1, wherein the body defines an orifice putting said chamber in communication with the atmosphere.

16. A damper as claimed in claim 10, wherein said second chamber is filled with air.

17. A damper as claimed in claim 10, wherein said second chamber is filled with an inert gas.

18. A damper as claimed in claim 10, wherein the plate defines an orifice putting the second chamber in communication with the atmosphere.

19. A damper as claimed in claim 1, wherein the end portion of the rod inside the body has an enlarged part.

20. A damper as claimed in claim 19, wherein the enlarged part defines orifices.

21. A damper as claimed in claim 19, wherein the enlarged part is combined with orifices.

22. A damper as claimed in claim 19, wherein the enlarged part is combined with baffles.

* * * * *